Dec. 5, 1933.  R. LANQUETIN  1,938,074
APPARATUS FOR INDICATING THE RATIO BETWEEN
THE LINEAR FUNCTION OF TWO TEMPERATURES
Filed Sept. 30, 1927  2 Sheets-Sheet 2

Inventor:
ROGER LANQUETIN
BY Richards & Geier
ATTORNEYS

Patented Dec. 5, 1933

UNITED STATES PATENT OFFICE 1,938,074

APPARATUS FOR INDICATING THE RATIO BETWEEN THE LINEAR FUNCTION OF TWO TEMPERATURES

Roger Lanquetin, Neuilly-sur-Seine, France

Application September 30, 1927, Serial No. 223,118, and in France October 2, 1926

3 Claims. (Cl. 73—24)

Application has been filed in France October 2, 1926, Patent No. 622,442.

The subject of the present invention is an apparatus which is adapted to calculate the value of the relative humidity either from the indications of the dry bulb thermometer and of the wet bulb thermometer, or else directly without it being necessary to read the temperatures of the dry bulb thermometer and of the wet bulb thermometer.

The object the invention has in view is to obtain a calculating apparatus characterized by the combination of two scales, one corresponding to $t$ plus a constant, the other to $t'$ plus a constant, $t$ and $t'$ being respectively the temperatures of the wet bulb thermometer and of the dry bulb thermometer, so that it will be possible to determine easily the ratio $$\frac{t+K}{t'+K}$$

and deduce therefrom the relative humidity.

It has been observed that within a certain range of temperatures, the ratio $$\frac{t+K}{t'+K}$$

is practically constant for a given value of the relative humidity if the constants are suitably chosen. For example, the ratio $$\frac{t+14.4}{t'+14.4}$$

for the different values of the relative humidity takes the following values:

| Relative humidity | $\frac{t+14.4}{t'+14.4}$ |
|---|---|
| Percent | |
| 100 | 1 |
| 90 | 0.970 |
| 80 | 8.936 |
| 70 | 0.905 |
| 60 | 0.869 |
| 50 | 0.833 |
| 40 | 0.790 |
| etc. | etc. |

If, then, the fixed scale of a calculating rule is graduated in lengths proportional to log.$(t+K)$ and the movable scale of the rule in lengths proportional to log.$(t'+K)$ and if the division of the rule corresponding to $t'+K$ is made to coincide with the division of the rule corresponding to $t+K$, for a given value of the ratio $$\frac{t+K}{t'+K}$$

that is, of the relative humidity, the position of the movable scale rod relatively to the rule will be independent of the temperature.

It follows from this that a pointer rigid with the movable bar, moving in front of a scale rigid with the rule, will indicate the relative humidity, if the scale is graduated accordingly.

Under ordinary atmospheric conditions, the ratio $$\frac{t+K}{t'+K}$$

is subject to much smaller variations than the temperatures. It will be of interest, for this reason, to employ a circular calculating rule on which the reading of the relative humidity is made on a much larger radius than that of the temperatures.

The invention will appear more clearly from the following detailed description when taken in connection with the accompanying drawings showing a preferred embodiment of the inventive idea.

Figure 1:
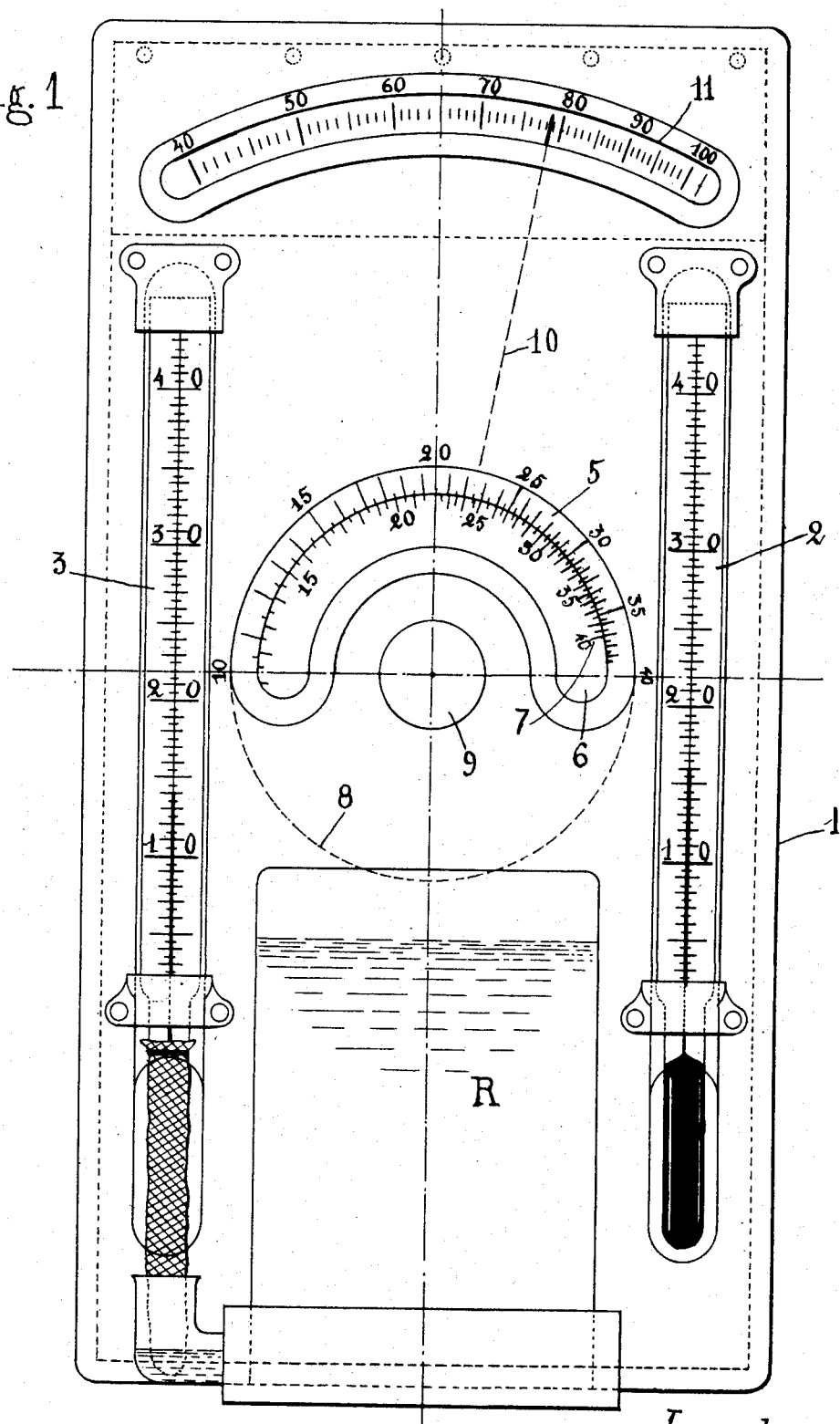
Figure 1 is a front view of an apparatus constructed in accordance with the principles of this invention.
Figure 2:
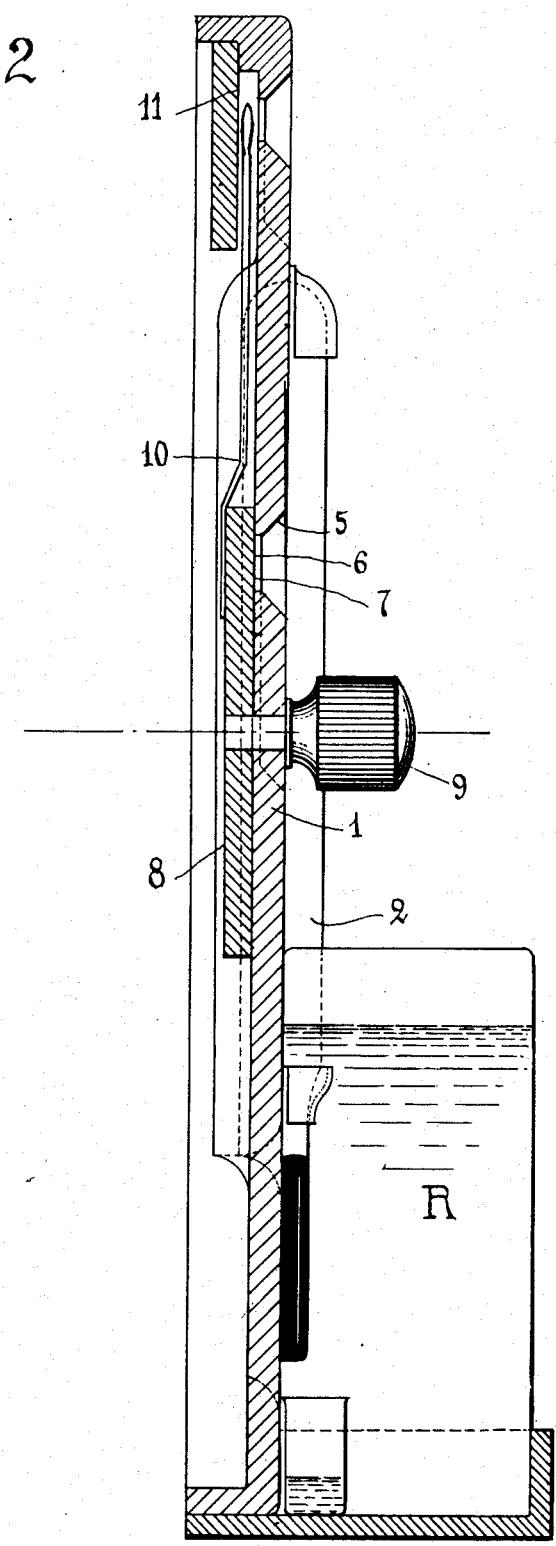
Figure 2 is a central vertical section of Figure 1.

As shown in the drawings, a plate 1 carries two thermometers, a dry bulb thermometer 2 and a wet bulb thermometer 3 the bulb of which is kept wet by a mesh of fabric plunging into the neck of a vessel R.

Upon the plate 1 is traced a circular scale 5 representing the values of $t$, or wet bulb temperature, obtained by describing, for each value of $t$, from a fixed radius of origin, angles proportional to log.$(t+K)$.

A circular aperture 6 permits a scale 7 identical to 5 to be seen.

This scale 7 is carried by a disc 8 which can be made to turn about its pivot by turning a milled head 9. A pointer 10, integral with the disc 8, moves in front of a scale 11 obtained by describing from an origin, angles proportional to log.

$$\frac{(t+K)}{t'+K}$$

upon which scale the values of the relative humidity will be indicated directly.

The reading of $t$ will be made on the wet bulb thermometer, of $t'$ on the dry bulb thermometer. By turning the milled head the graduations corresponding to $t$ and to $t'$ will be made to coincide with each other. The pointer will indicate the relative humidity of the atmosphere in which the apparatus is placed.

What I claim is:—

1. A calculating apparatus comprising a wet thermometer giving readings of temperature $t$ a dry thermometer, giving readings of temperature $t'$ a fixed circular scale graduated for a function of $t$ and a movable circular scale graduated for a function of $t'$, a third scale graduated in relative humidity and a pointer rigid with said movable scale moving in front of said third scale, the arrangement being such that the position of the pointer on said third scale when observed values of $t$ and $t'$ are made to coincide on said fixed and movable circular scales, gives the relative humidity as and for the purpose set forth.

2. A calculating apparatus comprising in combination expansible means adapted to be influenced by the prevailing temperature $t$, expansible means adapted to be influenced by the temperature $t'$ of air saturated with moisture, a scale graduated for a function of $t$, a scale graduated for a function of $t'$, means for moving one of said scales with respect to the other scale, a third scale graduated in degrees of relative humidity and a pointer rigidly connected with said movable scale and moving in front of said third scale, the arrangement being such that the position of the pointer on said third scale when observed values of $t$ and $t'$ are made to coincide on said fixed and movable scales, gives the hygrometric degree as and for the purpose set forth.

3. A calculating apparatus, comprising in combination a scale graduated for a function of a temperature, another scale graduated for a function of a temperature, means for moving one of said scales with respect to the other scale, a third scale graduated in degrees of relative humidity, and a pointer connected with said movable scale and movable in front of said third scale, the position of the pointer on said third scale corresponding to a value of the relative humidity when observed values of the temperatures are made to coincide on the two first-mentioned scales.

R. LANQUETIN.